No. 801,057. PATENTED OCT. 3, 1905.
C. J. ANDERSON.
SAW SWAGE.
APPLICATION FILED AUG. 16, 1904.
2 SHEETS—SHEET 1.
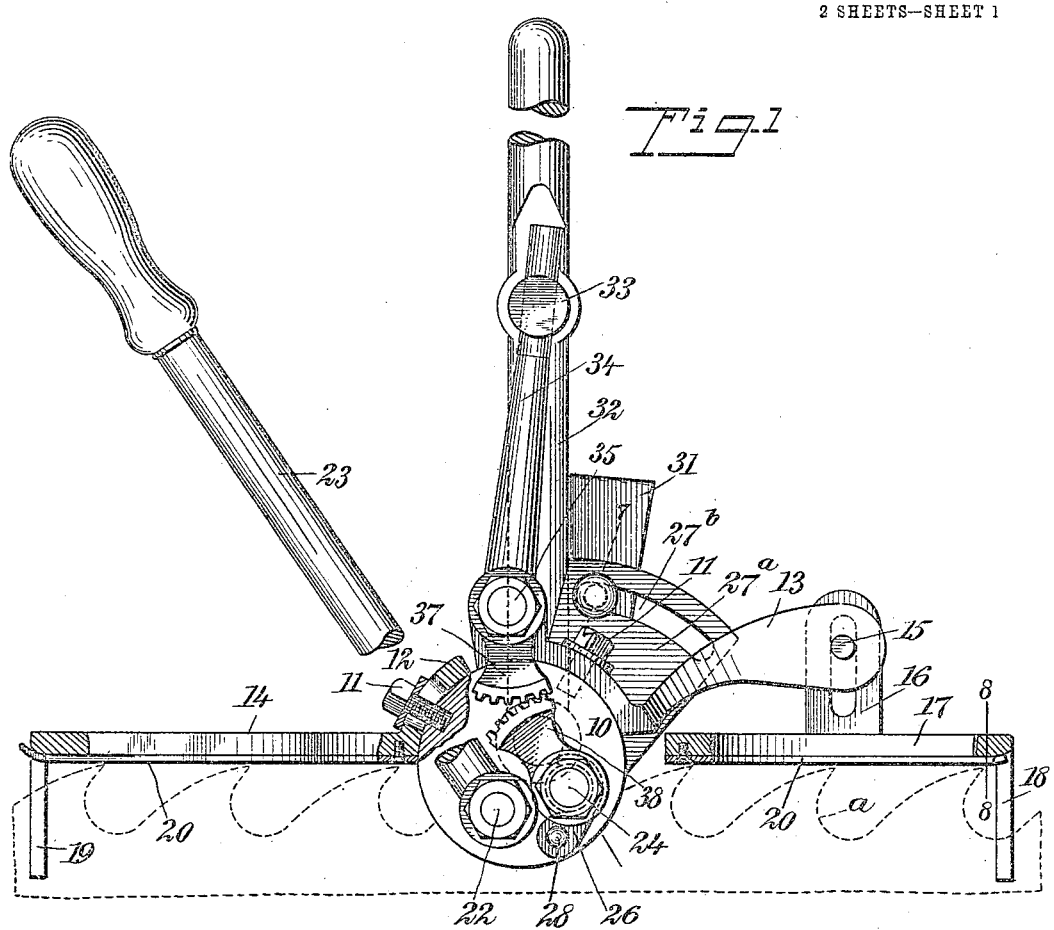
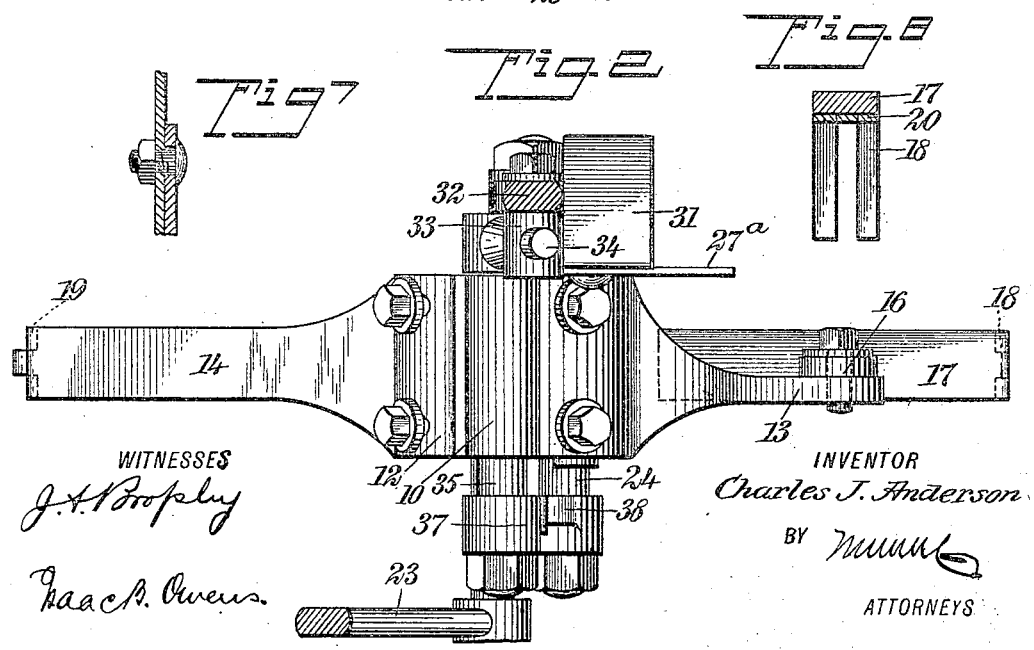
WITNESSES
J. A. Brophy
Isaac B. Owens
INVENTOR
Charles J. Anderson
BY
ATTORNEYS No. 801,057. PATENTED OCT. 3, 1905.
C. J. ANDERSON.
SAW SWAGE.
APPLICATION FILED AUG. 16, 1904.
2 SHEETS—SHEET 2.
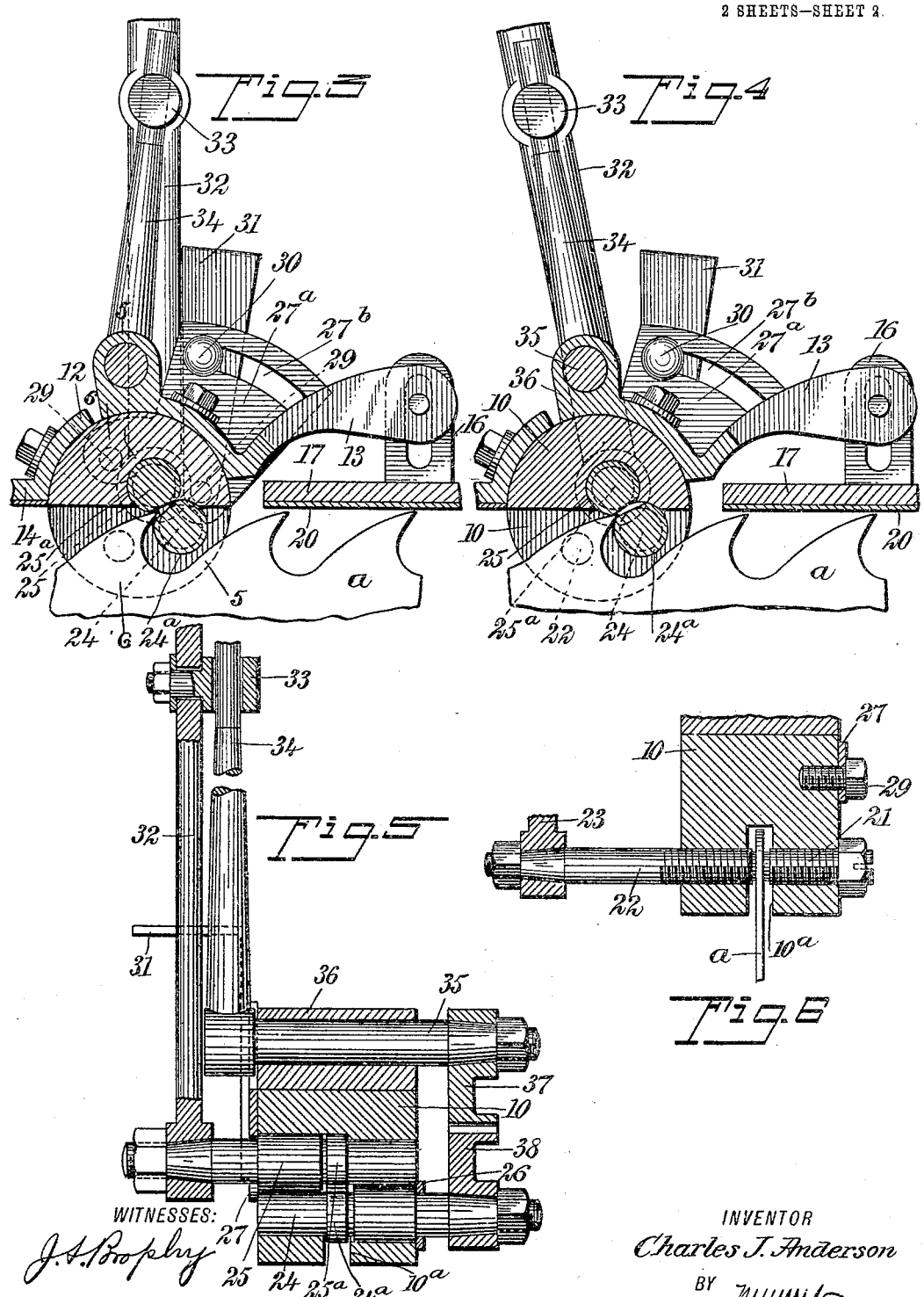
WITNESSES:
J. A. Brophy
Isaac B. Owens.
INVENTOR
Charles J. Anderson
BY
ATTORNEYS

UNITED STATES PATENT OFFICE.

CHARLES JOHN ANDERSON, OF EUREKA, CALIFORNIA.

SAW-SWAGE.

No. 801,057. Specification of Letters Patent. Patented Oct. 3, 1905.

Application filed August 16, 1904. Serial No. 220,909.

*To all whom it may concern:*

Be it known that I, CHARLES JOHN ANDERSON, a citizen of the United States, and a resident of Eureka, in the county of Humboldt and State of California, have invented a new and Improved Saw-Swage, of which the following is a full, clear, and exact description.

This invention relates to a device for drawing out or swaging the points of saw-teeth, particularly the teeth of circular saws, band-saws, and drag-saws.

The device comprises, completely stated, two die-cams which are associated with certain peculiar devices for mounting and operating them and by means of which the points of the saw-teeth may be easily and accurately spread, drawn out, or flattened to any extent desired, thus making it necessary only to slightly grind the teeth in order to finish the work of sharpening the saw.

The invention consists in certain novel features of construction and combination of parts, which will be hereinafter fully set forth, and pointed out in the claims.

Reference is to be had to the accompanying drawings, forming a part of this specification, in which similar characters of reference indicate corresponding parts in all the figures.

Figure 1 is a side elevation of the invention with parts broken away, this view also illustrating by dotted lines the position of the saw with respect to the swaging device. Fig. 2 is a plan view of the device. Fig. 3 is a cross-section particularly showing the swaging-dies and illustrating them in position for receiving a tooth of the saw. Fig. 4 is a similar view except that the dies are shown in the swaging action. Fig. 5 is a section through the dies and their operating means essentially on the line 5 5 of Fig. 3. Fig. 6 is a view showing the clamping-screw for holding the swager on the saw during the swaging operation, this view being essentially on the line 6 6 of Fig. 3. Fig. 7 is a detail section essentially on the line 7 7 of Fig. 1, showing the adjustable stop for the operating-lever; and Fig. 8 is a section essentially on the line 8 8 of Fig. 1, showing one of the arms for handling the saw and illustrating the fork at the end thereof.

10 indicates the body of the device, which has a slot or opening $10^a$ therein for the reception of the saw, as indicated at $a$ in the drawings. Adjustably attached to the body 10 by means of screws 11 are brackets 12 13, the former carrying rigidly and preferably integrally an arm 14 and the latter having adjustable connection by means of a screw 15 with a lug 16, rising from an arm 17. These arms 14 and 17 are located at opposite sides of the body of the device and are adapted to extend over the edge of the saw, said arms terminating in forks 18 and 19, straddling the saw. On their under sides the arms are provided with plates 20, securely attached to the arms and adapted to bear on the teeth of the saw. An anvil-screw 21 is mounted on the body 10 and projects into the slot or opening $10^a$ at one side thereof, and at the opposite side of the body 10 is located a clamping-screw 22, which coacts with the anvil-screw to clamp the swaging device on the saw. Said clamping-screw 22 is provided with an operating-arm 23, thus facilitating the movement of the screw in and out of engagement with the saw. (See Figs. 1 and 6.) The body is placed on the saw, which enters into the opening $10^a$ with the arms 14 and 17 lying on the edge of the saw and the forks 18 and 19 straddling the same. The anvil-screw 21 lies at one side of the saw and the clamping-screw 22 at the other side, and by tightening the clamping-screw the entire device will be rigidly secured on the saw.

Mounted to rock in the body 10 of the device and extending in parallel with it are two rolls 24 and 25, which have formed thereon the swaging-cams $24^a$ and $25^a$. (Best shown in Figs. 3 and 4.) Of these rolls the roll 24 lies quite within the slot 10, while the roll $25^a$ has its swaging-cam 25 just entered into the slot, the arrangement being such that when the rolls are in the position shown in Fig. 3 the point of the saw may be received between the swaging-cams, and when the rolls are located as shown in Fig. 4 the said cams will act on the point of the saw. The rolls 24 and 25 may be held in place by any desired devices. As here shown, lock-plates 26 and 27 are provided, these lock-plates bearing against shoulders formed on the rolls and being held in position by screws 28 and 29. The lock-plate 27, according to the structure here shown, has an extension $27^a$, formed with an arc-shaped slot $27^b$, therein. In this slot is a screw 30, which adjustably holds a stop-arm 31, arranged to limit the movement of an operating-arm 32. This arm 32 is attached to the roll $25^a$ to turn the same, and it carries a swivel-guide 33, loosely receiving the end of an arm 34, attached to a rock-shaft 35, mounted in a bearing 36, secured to the body 10 of the device. Said rock-shaft 35 carries a toothed sector 37 in mesh with a corresponding sector 38, fastened to the arm 34. When, therefore, the arm 32 is thrown to the right, as shown in Fig. 3, the rolls 24 and 25 are simultaneously rocked to separate the swaging-cams 24ª and 25ª, and when the arm is thrown leftward, as indicated in Fig. 4, a reversing movement takes place and the swaging-cams move toward each other, so as to pinch or draw out the points of the saw. The stop 31 limits the opening movement of the arm 32 and its connected parts, and this stop may be adjusted at will by the operation of the screw 30.

In the use of the device the body is clamped on the saw, as above explained, the arm 32 having been previously rocked rightward to the position shown in Fig. 3. When the swager is thus placed in position, care should be taken to enter the point of the tooth being acted upon between the swaging-cams. After this has been done the arm 32 should be operated to rock the cams toward each other, as shown in Fig. 4, and thus the swaging operation is performed, the point of the tooth being spread, drawn out, or flattened in such a way that it is only necessary to grind the tooth to place it in condition for work. After one tooth has been sharpened the clamping-screw 22 will be moved outward and the swager shifted to the next tooth, whereupon the above-described operation should be repeated.

Various changes in the form, proportions, and minor details of my invention may be resorted to without departing from the spirit and scope thereof. Hence I consider myself entitled to all such variations as may lie within the scope of my claims.

Having thus described my invention, I claim as new and desire to secure by Letters Patent—

1. A saw-swaging device comprising a body, two rocking swaging-tools mounted therein, a handle in connection with one tool, a rock-shaft, a swinging arm connected to the rock-shaft and having a sliding connection with the handle, and gearing for establishing connection with the rock-shaft and the other tool.

2. A saw-swaging device comprising a body, two positively-operating swaging-tools mounted thereon, a handle in connection with one tool, a rock-shaft mounted on the body, an arm in connection with the rock-shaft, means establishing connection between the handle and said arm, and means connecting the rock-shaft with the other tool.

3. A saw-swaging device comprising a body, two positively-operating swaging-tools mounted thereon, a handle in connection with one of said tools, a rock-shaft mounted on the body, an arm attached to the rock-shaft, means effecting a sliding connection between said arm and said handle, and toothed sectors meshed with each other and respectively connected with the rock-shaft and with the remaining tool for the purpose specified.

4. A saw-swaging device comprising a body, two positively-operating swaging-tools mounted thereon, a handle attached to one of the tools, a guide attached to the handle, a rock-shaft, an arm attached to the rock-shaft and sliding in the guide, and a means establishing connection between the rock-shaft and the other tool whereby both of the tools are operated together.

In testimony whereof I have signed my name to this specification in the presence of two subscribing witnesses.

CHARLES JOHN ANDERSON.

Witnesses:
J. M. CARSON,
F. M. KAY.